United States Patent Office 2,698,306
Patented Dec. 28, 1954

2,698,306

OXIDATION CATALYST

John F. Matejczyk, Pittsburgh, Pa., assignor to The O. Hommel Company, Pittsburgh, Pa., a corporation of Pennsylvania No Drawing. Application May 5, 1951, Serial No. 224,835

6 Claims. (Cl. 252—464)

This invention relates to an oxidation catalyst. More particularly, the invention relates to a catalyst useful for the vapor phase oxidation of hydrocarbons.

Vanadium pentoxide is extensively used as a catalyst for the oxidation of naphthalene to make phthalic anhydride. The vanadium oxide is deposited as a coating on a refractory carrier such as Alundum, corundum or fused alumina. The carrier having vanadium oxide coating is usually arranged in a fixed bed in a converter and naphthalene vapor with preheated air are passed through the catalyst bed. Depending upon the nature of the catalyst, the purity of the naphthalene, and the volume of air used, the catalyst will promote a 50–85% conversion of naphthalene to phthalic anhydride at a temperature of 400° to 500° C. The activity of these catalysts is not always uniform and they often become coated with reaction products so that their activity decreases until they must be removed from the converter to be revivified.

The primary object of the present invention is to provide a catalyst for vapor phase oxidation reactions between air or oxygen and hydrocarbons to give a high percentage conversion.

Another object of the invention is to provide a catalyst for a vapor phase oxidation reaction which actively promotes the reaction after it has attained the desired temperature and does not require priming to condition the catalyst bed for an efficient oxidation reaction.

A further object of the invention is to provide an oxidation catalyst which does not disintegrate during use.

A still further object of the invention is to provide a catalyst which promotes an oxidation reaction uniformly throughout the catalyst bed and does not develop hot spots therein.

With these and other objects in view, the invention consists in the improved oxidation catalyst hereinafter described and particularly defined in the claims.

The catalyst of the present invention is particularly adapted for the oxidation of organic compounds such as unsaturated hydrocarbons. For example, naphthalene may be oxidized to produce phthalic anhydride, benzene oxidized to maleic acid, ortho-xylene may be oxidized to produce phthalic anhydride, benzene may be oxidized to produce quinol and quinone, anthracene may be oxidized to produce anthraquinone, and unsaturated $C_4$ hydrocarbons such as isobutylene and butene-1, may be oxidized to produce phthalic anhydride.

The oxidation of the alkyl radicals attached to the benzene ring may be carried out at lower temperatures than the oxidation of benzene. Naphthalene and anthracene may be oxidized at lower temperatures than benzene. For example, naphthalene may be oxidized with the catalyst of the present invention at a temperature of 400° to 500° C. while benzene requires a temperature of 450° to 550° C. to complete the oxidation to produce maleic acid. Toluene may be oxidized with a catalyst of the present invention at temperatures varying between 375° to 400° C.

The catalyst of the present invention is preferably prepared by reacting ammonium meta vanadate with a tin oxide and alumina at temperatures between 900° to 1500° C. The products are fused at the temperatures used so that apparently the vanadate is first decomposed, then oxidized to vanadium pentoxide and then the $V_2O_5$ reacts with the $SnO_2$ and alumina to make a homogeneous reaction product. During the fusion reaction, the color of the reaction mixture changes from blue to red brown then to orange or yellow and finally assumes a copper color. The product is highly porous and hard so that it is stable under the oxidation reactions at temperatures as high as 600° C. It has been found that the vanadium content calculated as vanadium pentoxide may vary from 1 to 10%. The tin calculated as stannic oxide may vary from 85 to 97% while the aluminum calculated as aluminum oxide may vary from 1 to 5%. The composition which gives a high rate of conversion for the oxidation of benzene and naphthalene is composed of reaction products made up by the calcination of vanadium pentoxide 4%, stannic oxide 94% and alumina 2%. Either stannous or stannic oxide may be used in making the catalyst.

It has been found that if the product is to be uniform so that it will promote a uniform reaction throughout the catalyst bed, the temperature of fusion must be raised above 900° C. and preferably the calcination temperature is between 1350° to 1400° C. The more refractory aluminum oxides require temperatures as high as 1500° in order to get a homogeneous reaction mass.

It has been found that titanium and zirconium which are metals of the same group of the periodical table with tin may be used in place of tin. When the catalyst is made to contain titanium, vanadium, and aluminum, the titanium oxide content may vary between 50 and 85% of the mixture with vanadium pentoxide 1–10% and alumina 1–5%. When zirconium is used in place of tin, it has been found that 70% to 90% of zirconium oxide may be used with 1–10% vanadium pentoxide and 1–5% alumina. The percentages referred to in this application are percentages by weight.

The catalyst of the present invention differs from the usual vanadium oxide coating on refractory carrier in that the present invention is a homogeneous reaction mass which is porous and very active for promoting oxidation. The reaction mass is hard but can be pulverized so that it can be put into a finely pulverized condition to be used in vapor phase oxidation reactions wherein the catalyst acts as a fluid catalyst.

In a large number of tests the average conversion efficiency to produce diabasic organic acids is above 92%. The catalyst becomes immediately active when it is raised to the conversion temperature so that no priming reaction is required to condition the catalyst to bring it to full activity. The uniform product furthermore promotes a homogeneous reaction and does not develop hot spots.

In carrying out the oxidation reaction with the catalyst of the present invention, it is preferable to preheat the air to a temperature within at least 100° of the reaction temperature and to add a volume of air from two to five times the theoretical requirement of air for promoting the reaction. Naphthalene may be oxidized at substantially atmospheric pressure, but pressure of two to ten atmospheres is desirable for the oxidation of benzene.

The preferred form of the invention having been thus described, what is claimed as new is:

1. A catalyst particularly adapted for the oxidation of unsaturated hydrocarbons comprising the reaction product obtained by a fusion at temperatures at 900 and 1500° C. of a mixture consisting of an oxide of a group of metals consisting of tin, zirconium and titanium in the proportion of 50 to 97%, an inorganic vanadate compound having a volatile cation, said compound being in the proportion of 1 to 10% calculated as vanadium pentoxide and alumina in the proportion of 1 to 5%.

2. The catalyst defined in claim 1 in which the fusion mixture consists of stannic oxide 75 to 85% the vanadate as $V_2O_5$ 1 to 10% and alumina 1 to 5%.

3. The catalyst for promoting a vapor phase oxidation of an unsaturated hydrocarbon with air as defined in claim 1 which consists of a mixture of 50% to 85% titanium oxide, 1 to 10% of the vanadate as vanadium pentoxide and 1 to 5% alumina.

4. A catalyst for promoting a vapor phase oxidation of an unsaturated hydrocarbon with air as defined in claim 1 in which the fusion mixture consists of 70 to 90% zirconium oxide the vanadate as $V_2O_5$, 1 to 10% and 1 to 5% alumina.

5. The catalyst as defined in claim 1 in which the fusion mixture consists of 94% $SnO_2$, 4% of the vanadate calculated as $V_2O_5$, and 2% $Al_2O_3$.

6. A catalyst particularly adapted for the oxidation of unsaturated hydrocarbon with air comprises a product resulting from the fusion at temperatures between 1350° and 1400° C. of stannic oxide in the proportion of 85 to 97% an inorganic vanadate compound having a volatile cation, said compound being in the proportion of 1 to 10% calculated as vanadium pentoxide and alumina in the proportions of 1 to 5%.

References Cited in the file of this patent

UNITED STATES PATENTS

| Number | Name | Date |
|---|---|---|
| 2,415,878 | Hale | Feb. 18, 1947 |
| 2,463,072 | Webb et al. | Mar. 1, 1949 |